United States Patent
Brand et al.

(10) Patent No.: US 12,264,610 B1
(45) Date of Patent: Apr. 1, 2025

(54) COLD START CATALYST BYPASS SYSTEM

(71) Applicant: FCA US LLC, Auburn Hills, MI (US)

(72) Inventors: Jeff Brand, Highland, MI (US); John D Frederick, Rochester Hills, MI (US); Kenneth E Hardman, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/425,038

(22) Filed: Jan. 29, 2024

(51) Int. Cl.
*F01N 3/20* (2006.01)
*F01N 3/28* (2006.01)
*F02B 37/12* (2006.01)
*F02B 39/10* (2006.01)

(52) U.S. Cl.
CPC ......... *F01N 3/2006* (2013.01); *F01N 3/2892* (2013.01); *F02B 37/12* (2013.01); *F02B 39/10* (2013.01)

(58) Field of Classification Search
CPC .............................. F02B 37/12; F01N 2410/06
See application file for complete search history.

(56) References Cited

U.S. PATENT DOCUMENTS

| | | |
|---|---|---|
| 8,528,327 B2 | 9/2013 | Bucknell et al. |
| 2011/0243721 A1 | 10/2011 | Alajbegovic et al. |
| 2014/0060006 A1 * | 3/2014 | Ruona ............ F01N 3/2006 60/273 |
| 2019/0242296 A1 | 8/2019 | Zhang et al. |
| 2020/0131981 A1 * | 4/2020 | Buerkle ............ F02D 41/0245 |
| 2022/0235725 A1 | 7/2022 | Brand et al. |

FOREIGN PATENT DOCUMENTS

| | | | | |
|---|---|---|---|---|
| DE | 102012011086 A1 * | 12/2013 | ............ | F02B 37/004 |
| WO | WO-2009145002 A1 * | 12/2009 | ............ | F01N 3/2006 |

* cited by examiner

*Primary Examiner* — Jonathan R Matthias
(74) *Attorney, Agent, or Firm* — Jeremy J. Klobucar

(57) ABSTRACT

An internal combustion engine system includes an internal combustion engine, a main exhaust aftertreatment system with a main catalytic converter configured to receive exhaust gas from the internal combustion engine, and a turbocharger turbine selectively rotatable in a first direction for a normal operation and an opposite second direction for a reverse rotation operation. A light-off catalyst bypass system with a bypass passage and a bypass catalytic converter is configured to selectively receive exhaust gas from the internal combustion engine and bypass the turbine. During cold start, long idle, and/or low main catalytic converter temperature conditions, the turbine is rotated in the second direction to restrict or prevent exhaust gas from flowing through the turbine to facilitate directing the exhaust gas through the bypass passage and the bypass catalytic converter.

9 Claims, 2 Drawing Sheets

COLD START CATALYST BYPASS SYSTEM

FIELD

The present application relates generally to internal combustion engine aftertreatment systems and, more particularly, to an internal combustion engine having a light-off catalyst bypass system.

BACKGROUND

In conventional internal combustion engine aftertreatment systems it is difficult to achieve low tailpipe emissions in the time immediately following a cold engine start due to low catalyst conversion efficiency of cold catalysts. In order to achieve acceptable conversion efficiency, the catalyst must surpass a predetermined light-off temperature. In some systems, faster light-off temperatures may be achieved, but often at the cost of high exhaust system backpressure, durability, longevity, cost, and/or complexity. Thus, while such conventional systems do work well for their intended purpose, it is desirable to provide continuous improvement in the relevant art.

SUMMARY

In accordance with one example aspect of the invention, an internal combustion engine system is provided. In one example implementation, the engine system includes an internal combustion engine, a main exhaust aftertreatment system with a main catalytic converter configured to receive exhaust gas from the internal combustion engine, and a turbocharger turbine selectively rotatable in a first direction for a normal operation and an opposite second direction for a reverse rotation operation. A light-off catalyst bypass system with a bypass passage and a bypass catalytic converter is configured to selectively receive exhaust gas from the internal combustion engine and bypass the turbine. During cold start, long idle, and/or low main catalytic converter temperature conditions, the turbine is rotated in the second direction to restrict or prevent exhaust gas from flowing through the turbine to facilitate directing the exhaust gas through the bypass passage and the bypass catalytic converter.

In addition to the foregoing, the described engine system may include one or more of the following features: an exhaust manifold configured to supply exhaust gas through a main exhaust passage, through the turbine, and to the main exhaust aftertreatment system and the main catalytic converter, wherein the bypass passage is in fluid communication with the exhaust manifold; a bypass valve configured to move between a first position that enables exhaust gas to flow through the bypass passage, and a second position that prevents exhaust gas flow through the bypass passage and the bypass catalytic converter; wherein the bypass valve is moved to the first position when the turbine is rotated in the second direction; and wherein the bypass valve is moved to the second position when the turbine is rotated in the first direction.

In addition to the foregoing, the described engine system may include one or more of the following features: an electric motor operably coupled to the turbine and configured to selectively rotate the turbine in the first direction or the second direction; wherein the electric motor is electrically coupled to a high voltage battery; a controller in signal communication with the electric motor and configured to operate the electric motor to rotate the turbine in the first direction or the second direction; wherein the controller is in signal communication with the bypass valve and configured to move the bypass valve between the first and second positions; and wherein rotating the turbine in the second direction prevents flow of exhaust gas through the turbine.

In accordance with another example aspect of the invention, a method of operating an internal combustion engine system is provided. In one example implementation, the engine system includes an internal combustion engine, a main exhaust aftertreatment system with a main catalytic converter configured to receive exhaust gas from the internal combustion engine, and a turbocharger turbine selectively rotatable in a first direction for a normal operation and an opposite second direction for a reverse rotation operation. A light-off catalyst bypass system with a bypass passage and a bypass catalytic converter is configured to selectively receive exhaust gas from the internal combustion engine and bypass the turbine.

In one example, the method includes monitoring, by a controller having one or more processors, a temperature of the main catalytic converter to determine if the temperature is below a predetermined light-off temperature; and rotating, by the controller, the turbine in the second direction when the temperature is below the predetermined light-off temperature to restrict or prevent exhaust gas from flowing through the turbine to facilitate directing the exhaust gas through the bypass passage and the bypass catalytic converter.

In addition to the foregoing, the described method may include one or more of the following features: wherein the internal combustion engine system further includes an exhaust manifold configured to supply exhaust gas through a main exhaust passage, through the turbine, and to the main exhaust aftertreatment system and the main catalytic converter, wherein the bypass passage is in fluid communication with the exhaust manifold; and wherein the internal combustion engine system further includes a bypass valve configured to move between a first position that enables exhaust gas to flow through the bypass passage, and a second position that prevents exhaust gas flow through the bypass passage and the bypass catalytic converter.

In addition to the foregoing, the described method may include one or more of the following features: moving the bypass valve, by the controller, to the first position when the temperature is below the predetermined light-off temperature to enable exhaust gas to flow through the bypass passage; moving the bypass valve, by the controller, to the second position when the temperature exceeds the predetermined light-off temperature to prevent exhaust gas to flow through the bypass passage; rotating, by the controller, the turbine in the first direction when the temperature exceeds the predetermined light-off temperature to enable exhaust gas to flow through the turbine; and wherein rotating the turbine in the second direction prevents flow of exhaust gas through the turbine.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
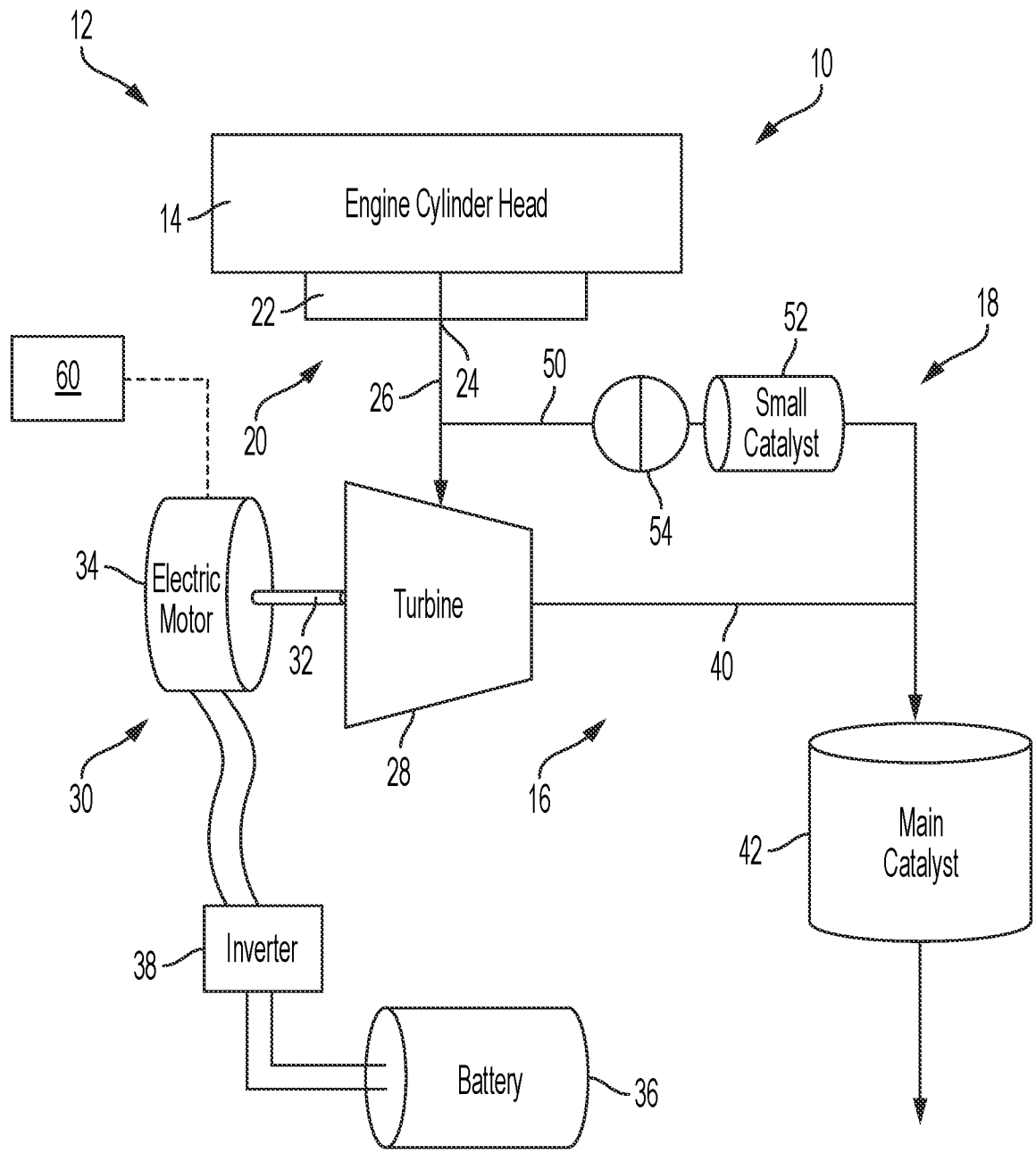
FIG. 1 is a schematic diagram of an example light-off catalyst bypass system in accordance with the principles of the present application.

As previously described, some conventional aftertreatment systems have limited or no capacity to get the catalyst to a light-off temperature for efficient conversion of harmful exhaust constituents before approximately fifteen seconds post cold start in a turbocharged system. Every second the engine is running and the catalyst is not at or above light-off temperature, CO HC, and NOx are not being converted efficiently. The short time preceding the catalyst light-off is responsible for a very large portion of the CO, HC, and NOx breakthrough for on and off cycle starts and long idles. In conventional systems, one or more catalysts are traditionally located some distance downstream of the exhaust outlet of the heat and/or turbocharger outlet and are typically in the main exhaust flow for the entire useful life of the vehicle.

Accordingly, described herein are systems and methods for a light-off catalyst bypass system for improving exhaust emissions during start-up of an internal combustion engine. The system utilizes an electric turbocharger and an exhaust bypass with an additional small auxiliary catalyst with an optional block-off valve. During a cold start, long idle, and/or low main catalyst temperatures, the electric turbocharger turbine is rotated in reverse direction to route the exhaust gases to the auxiliary catalyst instead of through the turbine before it re-enters the main exhaust path. This allows for rapid catalyst light-off and improved conversion of harmful exhaust constituents without requiring an additional, separate valve system to block flow through the turbine.

In one example, the system described herein utilizes one or more electric turbochargers that include a compressor, a turbine, and a shaft that connects the compressor and turbine. An electric motor applies torque to the shaft, and an energy storage device (e.g., battery) supplies power to the electric motor. The electric turbocharger is utilized in combination with a bypass catalyst system that includes a bypass passage, an auxiliary bypass catalyst, and a bypass valve for blocking off flow into the bypass passage. The inlet of the bypass passage is located upstream of the turbine inlet as close as possible to the exhaust ports or cylinder head to minimize heat losses in the exhaust gas. Because of its small size and low surface area/distance from the exhaust valves, the auxiliary bypass catalyst warms up more rapidly than a conventional catalyst.

During a cold engine start-up event or other situation where it is desirable to have the exhaust gas flow through the bypass catalyst system, the electric turbocharger is rotated in the direction reverse of normal operation and the bypass valve is opened. The reverse rotation of the turbine drives the exhaust gas through the bypass passage, thereby bypassing the turbine without the need for a separate and much larger valve system. Limiting flow from proceeding directly through the turbine and to the conventional main catalyst during cold start is desirable because the main catalyst cannot effectively convert exhaust constituents before it reaches the light-off temperature.

The exhaust exiting the bypass catalyst is directed at the inlet of the main catalyst to assist in heating the main catalyst to the light-off temperature. Once the main catalyst light-off is achieved, the electric turbocharger can begin rotating in the normal non-reversed direction, and the bypass valve or other means is utilized to stop flow through the bypass catalyst system, thus allowing normal engine operation to commence.

Advantages of the system include: extremely fast catalyst light-off times, the ability to selectively drive most or all of the exhaust flow through a bypass catalyst before going through the main exhaust path without requiring additional valves, actuators, or flow blockages; extremely short distance, surface area, and thermal mass between the exhaust ports and the bypass catalyst via bypassing the turbocharger turbine; the ability to bypass and deactivate the bypass catalyst after light-off; extremely high cell density substrate in the catalyst that would not be used in a non-bypassable system due to excessive backpressure; and the ability to move PGM (platinum group metals) away from the main catalyst and onto the bypass catalyst for better PGM utilization.

With initial reference to FIG. 1, an internal combustion engine system 10 having an internal combustion engine 12 with a cylinder head 14 is illustrated in accordance with the principles of the present application. In the example embodiment, the cylinder head 14 is configured to selectively supply exhaust gas to a main exhaust aftertreatment system 16 and a light-off catalyst bypass system 18. As described herein in more detail, the light-off catalyst bypass system 18 is selectively utilized during cold start, long idle, and/or cold catalyst conditions to rapidly heat to light-off temperatures to quickly achieve low tailpipe emissions.

As shown in FIG. 1, the engine system 10 further includes an exhaust manifold 20 having a plurality of cylinder exhaust passages 22 that merge together to form an outlet 24 to a main exhaust passage 26. In some embodiments, the exhaust manifold 20 may be coupled (e.g., bolted) to the cylinder head 14 or alternatively integrated therein. The main exhaust passage 26 is configured to direct the exhaust gas to the main exhaust aftertreatment system 16 via a turbine 28 of a turbocharger 30. In one example, the exhaust passage 26 may be part of the inlet to turbine 28.

In one example embodiment, the turbocharger 30 is an electric turbocharger having a shaft 32 coupled between the turbine 28 and a compressor (not shown) in a conventional manner. An electric motor 34 is operably coupled to the shaft 32 and is configured to rotate the shaft 32 in a first direction for normal operation and an opposite second direction for a reverse rotation operation. The electric motor 34 is electrically coupled to and powered by a battery 36, for example of a high voltage (e.g., 48V) battery system, via an inverter 38. However, it will be appreciated that any suitable power source may be utilized that enables electric motor 34 to function as described herein.

In the normal operation, the compressor compresses engine intake air and the turbine 28 expands exhaust gas to recover energy to rotate the shaft 32 and the compressor. In the reverse rotation operation, the turbine 28 is rotated in the reverse (of normal) direction to prevent exhaust gas from the exhaust manifold 20 from flowing through the turbine 28. Instead, the reverse rotation operation is configured to facilitate directing the exhaust gas flow from the exhaust manifold 20 through the light-off catalyst bypass system 18, as described herein in more detail.

In the example embodiment, the main exhaust aftertreatment system 16 generally includes a main exhaust conduit 40 having one or more main catalytic converters 42 to reduce or convert a desired exhaust gas constituent such as, for example, carbon monoxide (CO), hydrocarbon (HC), and/or nitrogen oxides (NOx). The main exhaust conduit 40 is fluidly coupled to the exhaust manifold outlet 24 via the turbine 28 and is configured to receive exhaust gas from the vehicle engine 12 and supply the exhaust gas to the main catalytic converter 42. In order to efficiently reduce or convert CO, HC, and NOx, the main catalytic converter 42 must reach a predetermined light-off temperature. However, during some vehicle operations such as cold starts, the main catalytic converter 42 is below light-off temperature and therefore has a low catalyst conversion efficiency.

In order efficiently reduce or convert the unwanted exhaust gas constituents while the main catalytic converter 42 is below the light-off temperature, the vehicle utilizes the light-off catalyst bypass system 18, which generally includes a bypass passage 50, a bypass catalytic converter ("bypass catalyst") 52, and optionally a bypass valve 54. The light-off catalyst bypass system 18, along with the turbine reverse rotation operation, is configured to redirect at least a portion of the exhaust gas from the exhaust manifold 20, into the bypass passage 50, and through the auxiliary bypass catalyst 52.

Because the bypass catalyst 52 is located close to the cylinder head 14, it is in close proximity to the engine combustion chambers and receives the exhaust gas quicker and at a higher temperature than the main catalytic converter 42 would due to heat loss to the turbine 28. Thus, the bypass catalyst 52 is rapidly heated to its predetermined light-off temperature to achieve high catalyst conversion efficiency before the main catalytic converter 42 alone. It will be appreciated that the light-off catalyst bypass system 18 may have various configurations and be integrated with or into the cylinder head 14 in various manners. Some example configurations are shown and described in commonly owned U.S. patent application Ser. No. 17/158,258, filed Jan. 26, 2021 and U.S. patent application Ser. No. 18/309,382, filed Apr. 28, 2023, the entire contents of which are incorporated herein by reference thereto.

A controller 60 (e.g., engine control unit) is in signal communication with the electric motor 34 and the bypass valve 54 (if present). The controller 60 is configured to operate the electric motor 34 to selectively rotate shaft 32 in the first direction or the opposite second (reverse) direction. In this way, with the reverse rotation operation, exhaust gas is selectively prevented from going through the turbine 28 and is instead directed through bypass passage 50. Additionally, the controller 60 is configured to move the bypass valve 54 to any position between a fully open first position and a fully closed second position. In the first position, the bypass valve 54 enables exhaust gas to flow through the bypass passage 50 and thus the bypass catalyst 52. In the second position, the bypass valve 54 prevents exhaust gas from flowing through the bypass passage 50 and bypass catalyst 52. Although illustrated in the example implementation as a butterfly valve, it will be appreciated that bypass valve 54 may be any suitable valve that enables light-off catalyst bypass system 18 to operate as described herein.

In one example, the bypass catalyst 52 is a three-way catalyst configured to remove CO, HC, and NOx from the exhaust gas passing therethrough, as described herein in more detail. However, it will be appreciated that bypass catalyst 52 may be any suitable catalyst that enables light-off catalyst bypass system 18 to remove any desired pollutant or compound such as, for example, a hydrocarbon trap or a four-way catalyst. In another example, bypass catalyst 52 has a cell density of between approximately 800 and approximately 1200 cells per square inch, or between 800 and 1200 cells per square inch.

In the example embodiment, the light-off catalyst bypass system 18 is configured to selectively operate in (i) a normal or warm catalyst mode and (ii) a cold catalyst mode. In the warm catalyst mode, controller 60 determines the main catalytic converter 42 has reached the predetermined light-off temperature (e.g., via temperature sensor, model, etc.) and allows rotation of the turbocharger shaft 32 in the normal direction. Controller 60 also moves the bypass valve 54 to the fully closed position. In this mode, the bypass valve 54 facilitates preventing the exhaust gas in the exhaust manifold 20 from entering the bypass passage 50 and thus bypass catalyst 52. Instead, the exhaust gas is directed through main exhaust passage 26, the turbine 28, into the main exhaust conduit 40, and through the main catalytic converter 42 before being exhausted to the atmosphere.

In the cold catalyst mode, controller 60 determines the main catalytic converter 42 is below the predetermined light-off temperature (e.g., a cold start), and subsequently operates the electric motor 34 to rotate the shaft 32 and turbine 28 in the opposite direction to prevent exhaust gas flow through the turbine 28. If present, the controller 60 also moves the bypass valve 54 to the fully open position to enable the exhaust gas to flow through the bypass passage 50. In this mode, the reverse rotation of turbine 28 restricts or prevents exhaust gas from passing through the turbine 28. Instead, the open bypass valve 54 enables the exhaust gas to be directed through bypass passage 50 and bypass catalyst 52 before being directed to the main exhaust conduit 40 and atmosphere. Once the main catalytic converter 42 has reached the light-off temperature, the controller 60 may then operate the turbine 28 normally and close bypass valve 54.

Figure 2:
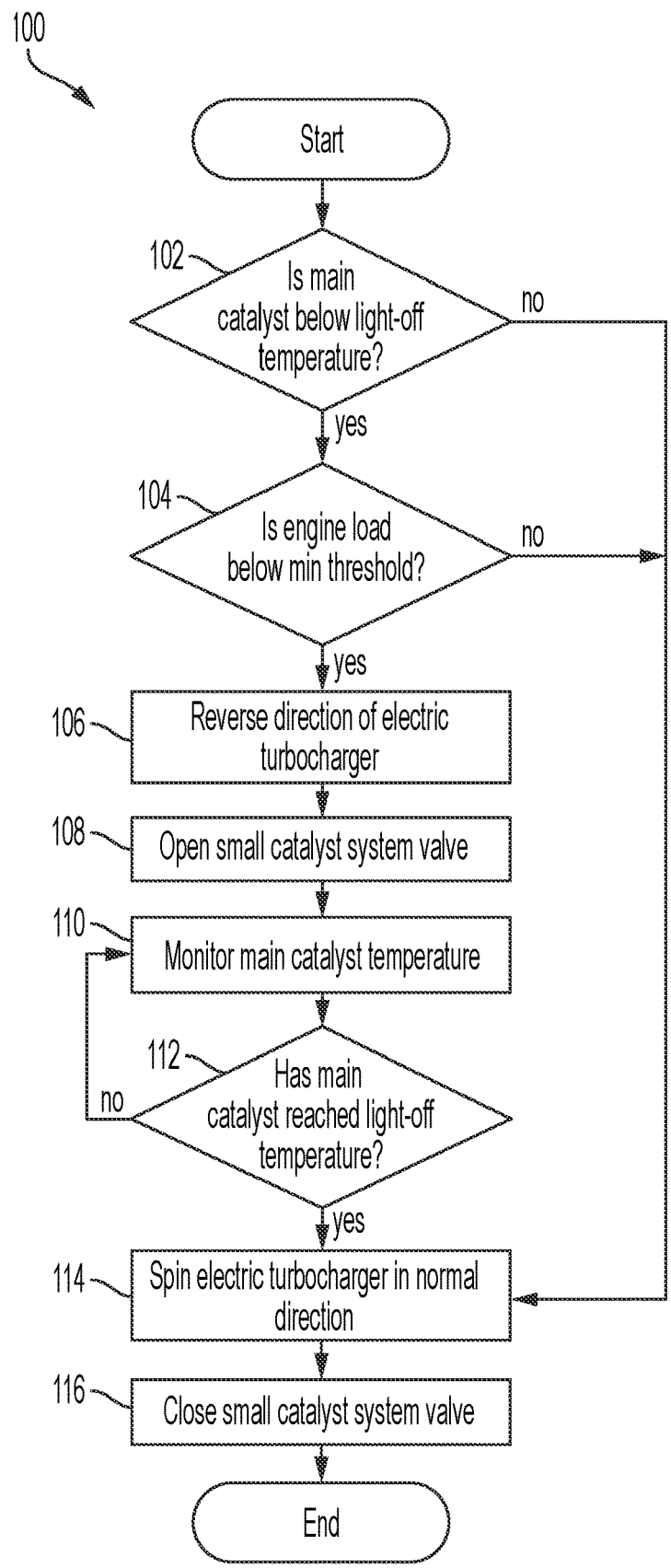
FIG. 2 is a flow control diagram of an example method of operating the light-off catalyst bypass system in FIG. 1, in accordance with the principles of the present application.

With reference now to FIG. 2, a flow diagram of an example method 100 of operating the engine system 10 is illustrated. At step 102, controller 60 (control) determines if the main catalyst 42 is below a predetermined light-off temperature. If no, control proceeds to step 114. If yes, control proceeds to step 104 and determines if an engine load is below a minimum threshold (e.g., a load/flow the bypass passage 50 can handle). If no, control proceeds to step 114. If yes, control proceeds to step 106 and operates the motor 34 to rotate the shaft 32 and turbine 28 in the reverse direction to prevent exhaust gas flow through the turbine 28.

At step 108, control opens the bypass valve 54 to allow exhaust to pass through the bypass passage 50. At step 110, control monitors the temperature of the main catalyst 42. At step 112, control determines if the main catalyst 42 has reached the predetermined light-off temperature. If no, control returns to step 110. If yes, control proceeds to step 114 and operates the motor 34 to rotate the shaft 32 and turbine 28 in the normal direction to allow exhaust gas flow through the turbine 28. At step 116, control closes the bypass valve 54. Control then ends or returns to step 102.

Described herein are systems and methods for improving vehicle emissions systems efficiency, particularly during cold start, long idle, and low main catalyst temperature conditions. The system includes a light-off catalyst bypass system with a small catalyst to receive exhaust flow during light-off (start-up), extended idle, some low load conditions, or other conditions. A turbine is selectively operated in the reverse direction to prevent flow therethrough to thereby direct the exhaust flow through the catalyst bypass system. A bypass valve selectively blocks flow to the small catalyst when the main catalyst has reached light-off temperature.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A method of operating an internal combustion engine system that comprises:
    an internal combustion engine;
    a main exhaust aftertreatment system with a main catalytic converter configured to receive exhaust gas from the internal combustion engine;
    a turbocharger turbine selectively rotatable in a first direction for a normal operation and an opposite second direction for a reverse rotation operation; and
    a light-off catalyst bypass system with a bypass passage and a bypass catalytic converter configured to selectively receive exhaust gas from the internal combustion engine and bypass the turbine, wherein the bypass passage is absent a valve configured to selectively allow flow through the bypass passage, the method comprising:
    monitoring, by a controller having one or more processors, a temperature of the main catalytic converter to determine if the temperature is below a predetermined light-off temperature;
    rotating, by the controller, the turbine in the second direction when the temperature is below the predetermined light-off temperature to restrict or prevent exhaust gas from flowing through the turbine to facilitate directing the exhaust gas through the bypass passage and the bypass catalytic converter; and
    rotating, by the controller, the turbine in the first direction when the temperature exceeds the predetermined light-off temperature to enable exhaust gas to flow through the turbine.

2. The method of claim 1, wherein the internal combustion engine system further includes an exhaust manifold configured to supply exhaust gas through a main exhaust passage, through the turbine, and to the main exhaust aftertreatment system and the main catalytic converter,
    wherein the bypass passage is in fluid communication with the exhaust manifold.

3. The method of claim 2, wherein the internal combustion engine includes a cylinder head, and wherein the bypass passage is integral with the cylinder head.

4. The method of claim 3, wherein the bypass catalytic converter is disposed within the cylinder head.

5. The method of claim 3, wherein the bypass catalytic converter has a cell density of between approximately 800 and approximately 1200 cells per square inch.

6. The method of 3, further comprising an electric motor operably coupled to the turbine and configured to selectively rotate the turbine in the first direction or the second direction.

7. The method of claim 6, wherein the electric motor is electrically coupled to a high voltage battery via an inverter.

8. The method of claim 6, further comprising operating, by the controller, the electric motor to rotate the turbine in the first direction or the second direction.

9. The method of claim 1, wherein rotating the turbine in the second direction prevents flow of exhaust gas through the turbine.

* * * * *